United States Patent
Romano et al.

(10) Patent No.: US 6,839,757 B1
(45) Date of Patent: Jan. 4, 2005

(54) SYSTEM AND METHOD FOR AUTOMATICALLY DISCOVERING ACCESSIBLE SERVICES ON A COMPUTER NETWORK AND PROVIDING AUTOMATIC ACCESS THERETO

(75) Inventors: Pasquale Romano, San Jose, CA (US); James Randall Turner, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 09/301,154

(22) Filed: Apr. 28, 1999

(51) Int. Cl.⁷ .......................................... G06F 15/173
(52) U.S. Cl. ............................... 709/226; 709/229
(58) Field of Search ............................ 709/217, 226, 709/229, 203, 250, 224

(56) References Cited

U.S. PATENT DOCUMENTS

| | | | |
|---|---|---|---|
| 5,724,355 A | | 3/1998 | Bruno et al. ............... 370/401 |
| 5,734,642 A | * | 3/1998 | Vaishnavi et al. .......... 370/255 |
| 5,745,754 A | * | 4/1998 | Lagarde et al. ............. 395/615 |
| 5,774,656 A | * | 6/1998 | Hattori et al. ............... 709/223 |
| 5,917,537 A | | 6/1999 | Lightfoot et al. ............... 348/3 |
| 5,951,694 A | | 9/1999 | Choquier et al. ............. 714/15 |
| 5,991,810 A | | 11/1999 | Shapiro et al. ............. 709/229 |
| 5,996,010 A | * | 11/1999 | Leong et al. ............... 709/223 |
| 6,021,433 A | * | 2/2000 | Payne et al. ................ 709/219 |
| 6,041,045 A | | 3/2000 | Alterman et al. ........... 370/313 |
| 6,061,722 A | * | 5/2000 | Lipa et al. .................. 709/224 |
| 6,122,639 A | * | 9/2000 | Babu et al. ................. 707/103 |
| 6,145,001 A | * | 11/2000 | Scholl et al. ............... 709/223 |
| 6,167,449 A | * | 12/2000 | Arnold et al. .............. 709/227 |
| 6,209,018 B1 | * | 3/2001 | Ben-Shachar et al. ...... 718/105 |
| 6,237,006 B1 | * | 5/2001 | Weinberg et al. ........... 707/103 |
| 6,311,197 B2 | * | 10/2001 | Mighdoll et al. ........... 715/513 |
| 6,336,138 B1 | * | 1/2002 | Caswell et al. ............. 709/223 |
| 6,523,696 B1 | * | 2/2003 | Saito et al. ................. 709/223 |
| 6,574,737 B1 | * | 6/2003 | Kingsford et al. .......... 713/201 |
| 6,598,094 B1 | * | 7/2003 | Wollrath et al. ............ 719/330 |
| 6,654,801 B2 | * | 11/2003 | Mann et al. ................ 709/224 |

OTHER PUBLICATIONS

Fyodor, The Art of Port Scanning, Phrack Magazine, vol. 7, No. 51, pp. 1–39, Sep. 1997.*
Granquist, L., NMAP Guide, www.insecure.org/nmap/lam-on-nmap-guide.txt, pp. 1–4, Apr. 11, 1999.*
Dibjersm A., Publicly Available Security Tools, Sys Admin, vol. 8, No. 4, pp. 1–4, Apr. 1999.*

\* cited by examiner

Primary Examiner—Larry D Donaghue
(74) Attorney, Agent, or Firm—Blakely Sokoloff Taylor & Zafman LLP

(57) ABSTRACT

A system and method for automatically discovering accessible services on a computer network and providing automatic access thereto. In particular, a gateway server is provided which periodically scans a building network for available network services and publishes links to the available network services over the Internet. Advantageously, a scanning engine of the gateway server periodically attempts to open a connection, or socket, with the port associated with each service to determine the availability of that service. The scanning engine initiates a second exchange with the port to validate the availability of the particular network service if the attempt to establish a connection with the port was successful. The scanning engine then creates a list of the identified accessible services. The list of accessible services may be configured as dynamic links on a gateway server web page to allow access to the identified network services from an outside network, via the dynamic links.

28 Claims, 7 Drawing Sheets

SYSTEM AND METHOD FOR AUTOMATICALLY DISCOVERING ACCESSIBLE SERVICES ON A COMPUTER NETWORK AND PROVIDING AUTOMATIC ACCESS THERETO

BACKGROUND OF THE INVENTION

1. Field of the Invention

The present invention relates generally to a computer network server, and relates more particularly to a system and method for automatically detecting accessible services on an inside computer network, and providing access to the detected accessible services from an outside computer network.

2. Description of the Background Art

Due, at least in part, to the increasing popularity of the Internet and the ability to share information or network services between computers, it is frequently desirable to provide access to certain network services on an inside network, such as a building wiring network, to a computer on an outside network, such as the Internet. In one common configuration, multiple computers are coupled to an inside network, which is separated from or interfaced with the outside network by a gateway device. Generally, a gateway device acts an entrance from one network to another. Typically, gateway devices are employed to interface an inside network and an outside network, such as the Internet.

For example, it is desirable, in some instances, to configure one or more computers on an inside network as web servers. Despite the advantages of having web server services or other network services available on an inside network, it is often cumbersome to make these inside network services visible, or otherwise available, over the outside network. Indeed, the initial set up of such a system can be cumbersome and time consuming, particularly for novice users. Additionally, in circumstances where network services are frequently added to or removed from the inside network, this set up must also be updated frequently. Hence, significant difficulties exist in permitting the services of a plurality of inside network devices to be visible and accessible from outside computers on the outside network. At least part of this difficulty stems from determining which computers or other devices are present on the inside network and what services are available on these devices.

An additional difficulty relates to permitting computer users outside the inside network to access the various network services available on the inside network. That is, once the network services available on the inside network are detected, these services need to be accessible by computers over the outside network.

Therefore, an improved system and method are needed to provide quick and easy access to an inside network, such as a building computer network from computers on an outside computer network, such as the Internet to provide access to the available inside network services. An additional need exists to provide a system and method by which a gateway device can automatically detect the network services available on the inside network. Yet another need exists to provide a system and method by which the network services available on the inside network may be accessed by outside network computers.

SUMMARY OF THE INVENTION

A system and method are disclosed to automatically detect or discover accessible services on an inside computer network, to publish links to the detected services on a web page, and to automatically permit a selected network service to be accessed from an outside network via a gateway device.

In general, the present invention provides a gateway server interposed between an inside network, such as a building wiring network, and an outside network, such as the Internet. The gateway server periodically scans, or polls, the various devices on the inside network to discover or detect available services on the inside network. Advantageously, the gateway server includes a web server for publishing over the outside network, on a gateway server web page, dynamic links to the available services as determined by the scanning, or polling, function. By performing this scanning function periodically, the gateway server continually updates the dynamic links to the available inside network services. In this manner, the available services on the inside wiring network may be visible, accessible, or both, from outside computers on the outside network via the gateway server.

According to one embodiment, the scanning function is accomplished by the gateway server periodically attempting to establish a connection, or socket, with an inside network device port that is associated with a particular inside network service. If a connection is established, then the gateway server assumes that the associated service is available at that port of that device and creates a dynamic link associated with that inside network service. The gateway server advantageously scans the ports associated with a predetermined set of network services for each building network device. Alternatively, the gateway server receives broadcasts or multicasts from the inside network services to detect or discover the available network services on the inside network and subsequently publishes those detected services on the gateway device web page, which is accessible from the outside network.

Then, when a user opens the gateway device web page, using an outside client browser, and selects a dynamic link associated with a certain network service, the gateway device forwards, proxies, routes, or transparently redirects connection from the outside client browser to the associated inside network detected service. In one embodiment, this is done using transparent redirection, in which the gateway server uses. HTTP (HyperText Transfer Protocol) redirect, to redirect the outside client browser to the selected inside network service via a portal associated with that service. Alternatively, the gateway device may initiate a proxy application associated with the particular type of inside network service selected and redirect the outside client browser to the proxy application. Once the outside client browser has been redirected to the proxy application, the proxy application manages communications between the outside client browser and the selected inside network service.

Other advantages and features of the present invention will be apparent from the drawings and detailed description as set forth below.

DETAILED DESCRIPTION OF THE PREFERRED EMBODIMENT

The present invention relates to a gateway server that scans for and detects available network services on an inside network. The gateway server also publishes dynamic links to the detected network services on a gateway server web, page so that these services may be accessed from an outside network via the gateway server web page. Various modifications to the preferred embodiment will be readily apparent to those skilled in the art and the generic principles herein may be applied to other embodiments.

Figure 1:
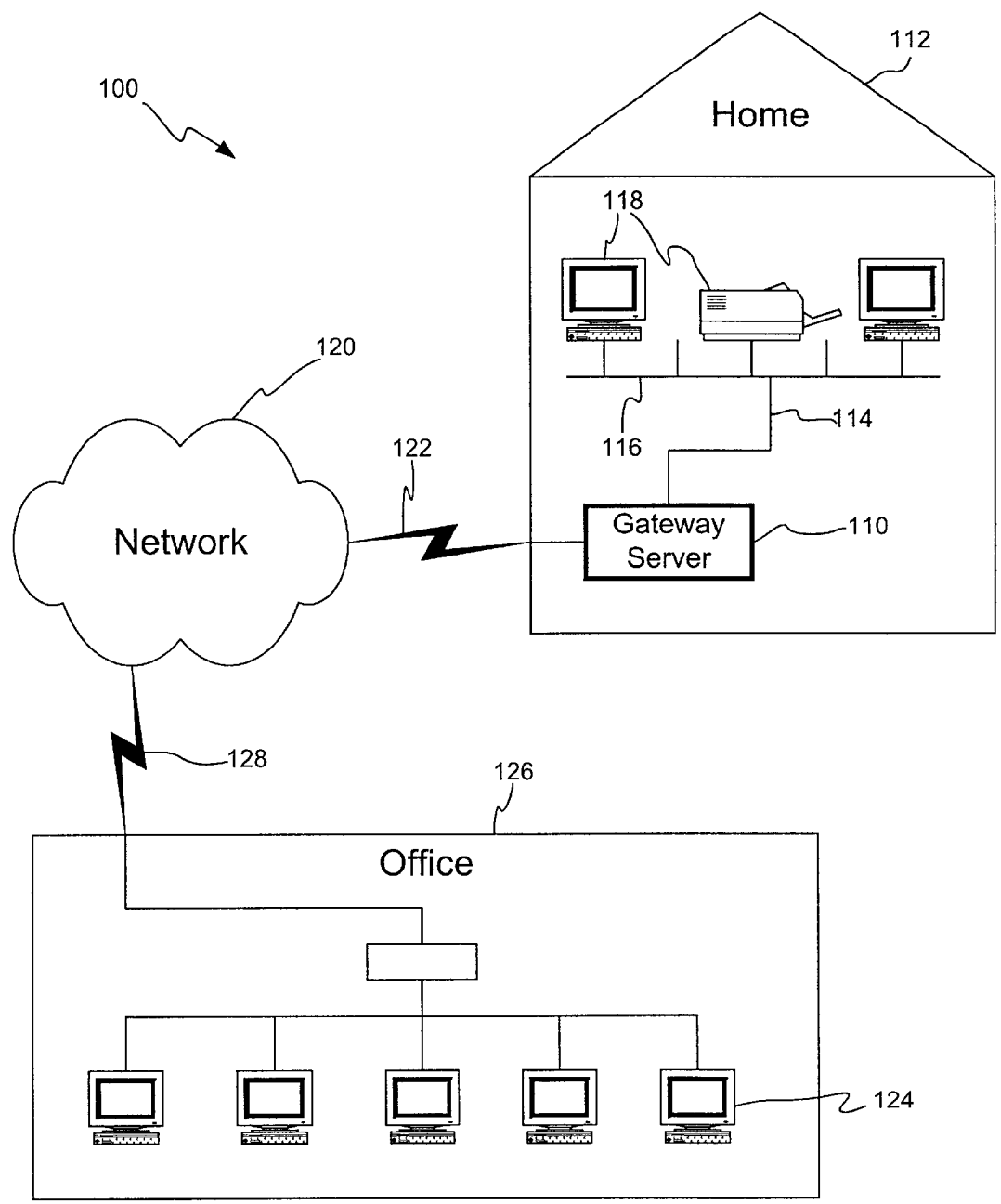
FIG. 1 is a schematic diagram illustrating a gateway server interposed between an inside computer network and an outside network, in accordance with the present invention.

FIG. 1 is a schematic diagram of one embodiment of a system 100 that includes a gateway server 110 located within a building, such as a home 112. As shown, the, gateway server 110 is coupled via an internal network line 114 to an inside network 116 having at least one inside network device 118. The inside network 116 may comprise a building wiring network. The inside network devices 118 may include, for example, network servers, shared printers, shared files, shared directories, and the like. A communications link 122 connects the gateway server 110 to an outside network 120, such as the Internet. As those skilled in the art will appreciate, the link 122 may comprise a telephone line, an ISDN line, or any other type of suitable communications link.

The inside network 116 can be accessed from an outside network client computer 124, such as an office computer, via the outside network 120 from an office 126 that is also connected to the outside network 120 via a communication link 129. In a preferred embodiment, the outside network 120 comprises the Internet. Advantageously, the outside network client computer 124 includes a standard web browser (not shown), such as Netscape Navigator™ or Microsoft Internet Explorer™, to access a web page published by the gateway server 110.

Figure 2:
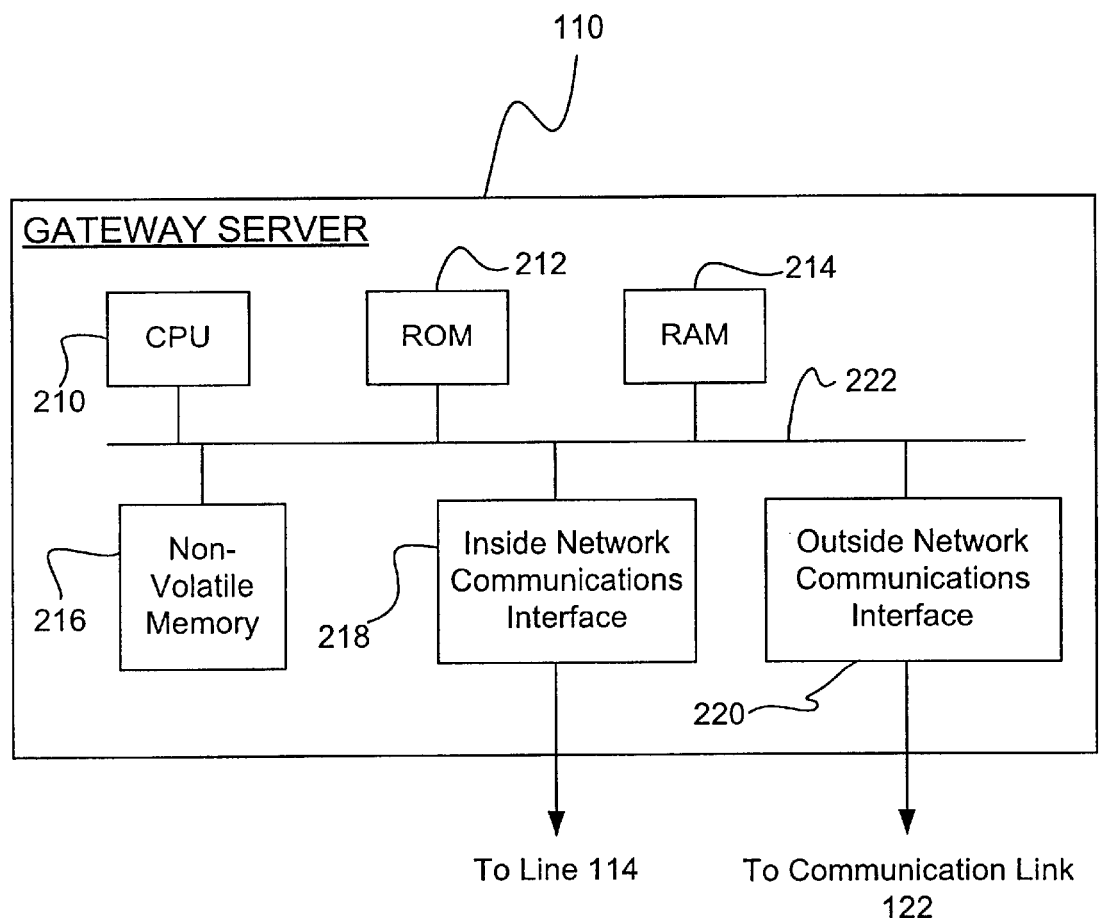
FIG. 2 is a block diagram of the gateway server shown in FIG. 1, according to the present invention.

FIG. 2 illustrates a block diagram of one embodiment of the gateway server 110. As shown, the gateway server 110 may include a central processing unit (CPU) 210, a read-only memory (ROM) 212, a random-access memory (RAM) 214, a non-volatile memory 216, an inside network communications interface 218, and an outside network communications interface 220 connected via a bus 222. The inside network communications interface 218 and the outside network communications interface 220 respectively connect to the inside network 116 and to the outside network 120 conventionally.

Figure 3:
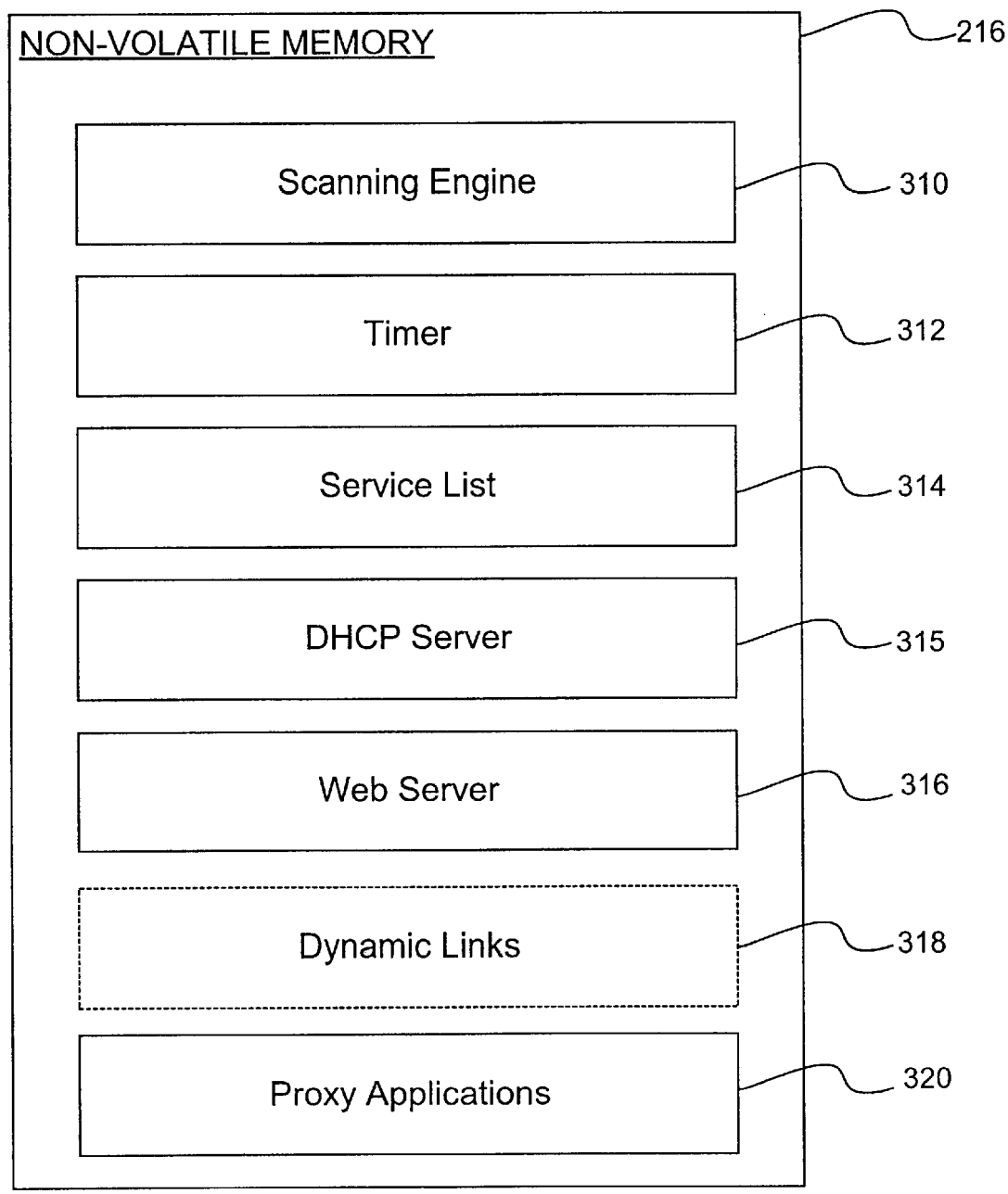
FIG. 3 is a block diagram of the non-volatile memory located within the gateway server as shown in FIG. 2, in accordance with the present invention.

FIG. 3 is a block diagram of one embodiment of the non-volatile memory 216 located within the gateway server 110. As illustrated, the non-volatile memory 216 includes a scanning engine 310, a timer 312, a service list 314, a DHCP (Dynamic Host Configuration Protocol) server 315, a web server 316, dynamic links 318, and proxy applications 320.

The scanning engine 310 periodically scans the network devices 118 on the inside network 116 to automatically detect accessible network services located on the inside network 116. Since the scanning engine 310 of the gateway server 110 automatically detects the available network services on the inside network 116, the addition, removal, or other changes of the available network services on the inside network 116 is substantially simplified. Specifically, in the present embodiment, users are not required to go through a cumbersome configuration or reconfiguration of the gateway server 110 each time a network service is added to or removed from the inside network 116. Particular details of the scanning function of the scanning engine 310 are described in more detail below.

Figure 4:
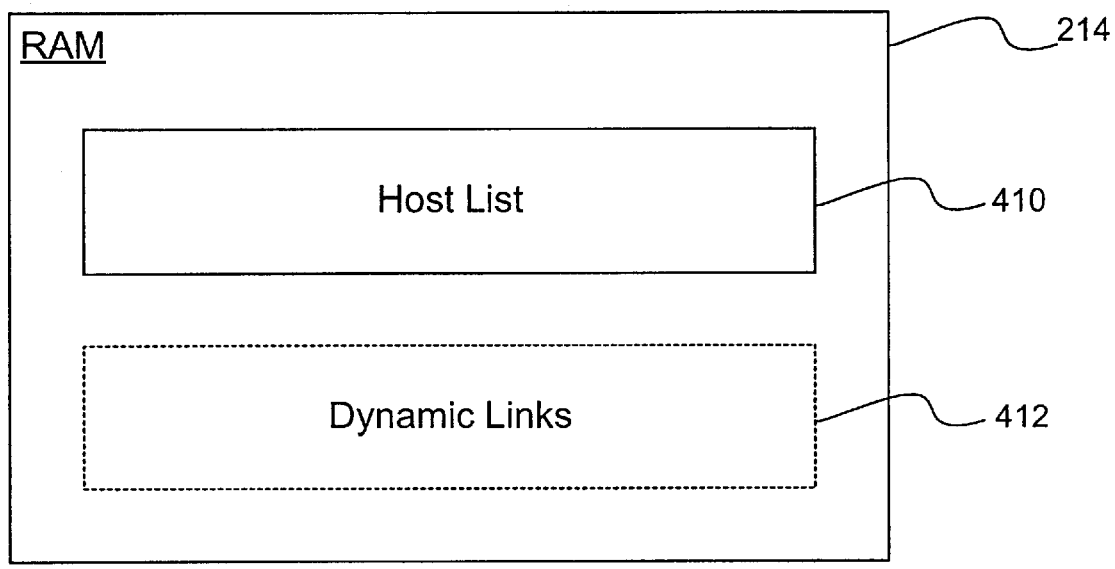
FIG. 4 is a block diagram of the RAM located within the gateway server as shown in FIG. 2, in accordance with the present invention.

Upon detecting, or discovering, certain available network services on the inside network 116, the scanning engine 310 creates a list of the detected or discovered services, which list may be stored in either the non-volatile memory 216 or the RAM 214. In one embodiment, the list of detected or discovered available services is published to the outside network 120 on a gateway server web page. Specifically, the scanning engine advantageously creates a set of dynamic links wherein each dynamic link is associated with a particular detected service. The links are then stored as dynamic links 318 in the non-volatile memory 216. Alternatively or additionally, the dynamic links can be stored and accessed in RAM 214, as is shown in FIG. 4, since the dynamic links are continually being created and updated. The accessible services can include, for example, web servers, web pages, FTP servers, FTP files, shared folders, directories, files, shared printers, hard drives, and other types of computer services that may be made accessible on a computer network.

As those skilled in the art will appreciate, access to the dynamic links 318 can be optionally password controlled at the gateway server 110 for added security. In this embodiment, the secured accessible services would still be listed in the dynamic links, but a password would be required after selecting the dynamic link. In another embodiment, a password may be required to view the dynamic links.

Upon creating the dynamic links, the gateway server 110 stores the dynamic links within a memory, such as the non-volatile memory 216 or RAM 214. The web server 316 then updates a gateway web page viewable from computers on the outside network 120, such as the outside network client computer 124 (FIG. 1). The gateway server web, page displays the dynamic links to the accessible services on the inside network 116, thereby allowing quick and easy access to this information from computers on the outside network 120.

In this configuration, a user at an outside network client computer 124 may access detected building network services by browsing to the web page of the gateway server 110 and selecting a dynamic link displayed thereon. The gateway server 110, in response to the selection of one of the dynamic links then forwards, proxies, routes, or transparently redirects connection from the outside client network 124 to the associated inside network detected service, details of which are discussed in more detail below in connection with FIGS. 6 and 7.

The timer 312 periodically invokes the scanning engine 310 so that the scanning engine 310 scans for available network services on the inside network 116 on a regular basis. The timer 312 can be set to invoke the scanning engine 310 on a regular, predetermined basis to periodically and dynamically provide current and valid dynamic links to accessible services on the inside network 116. Those skilled in the art will appreciate that the features of the timer 312 may be incorporated within the scanning engine 310 rather than as a separate module.

The service list 314 comprises a list of potentially available network services on the inside network 116 as well as program instructions and protocols for locating the various types of network services that may be available on the inside network 116. Indeed, those skilled in the art will appreciate that the specific details of scanning for different types of network services may differ with respect to each service type. In general, however, the gateway server 110, for each device on the building network 116 attempts to establish a connection for each of the types of services in the service list to determine which, if any, network services are available at that device.

Typically, each network service of a network device is associated with a particular port on that device. Hence, to determine whether a particular service is accessible on a given network device, the gateway server 110 attempts to establish a connection, or socket, with the port associated with that particular service.

For example, as the gateway server 110 scans a particular device 118 on the inside network 116 for HTTP server services, the gateway server 110 attempts to establish a connection on the specific TCP (Transfer Control Protocol) port address that is associated with HTTP server services for the particular device. For many devices, the HTTP server services are accessed via TCP port "80." If the gateway server 110 can open a connection, or a socket, with the TCP port associated with HTTP server services, then, at least in one embodiment, the gateway server 110 assumes that HTTP server services are present on that device and creates a dynamic link to this service. Those skilled in the art will appreciate that the gateway server 110 can validate or confirm the availability of the detected service by initiating additional exchange with the associated device port.

If, however, the gateway server 110 can not open such a connection, then the gateway server 110 assumes that no HTTP server services are available at that inside network device and, accordingly, does not create a dynamic link to that service. This method of scanning for available network services on the inside network 116 is described in more detail below in connection with FIG. 5.

The DHCP (Dynamic Host Configuration Protocol) server 315 detects network devices 118 that are connected to the inside network 116 and centrally manages and automates the assignment of Internet Protocol (IP) addresses in the inside network 116. The DHCP server 315 assigns an IP address for each computer or device that is connected to the inside network 116. In particular, as each computer or device connected to the inside network 116 is initialized, it connects to the DHCP server 315 to obtain an IP address. The DHCP server 315 provides the input to the host list 410 (FIG. 4), which comprises a list of the computers and other network devices that are present, or active, on the inside network 116. Those skilled in the art will appreciate that the DHCP server 315 could alternatively comprise a separate module or device connected to the inside network 116.

The web server 316 publishes the current set of dynamic links to all of the accessible services on the inside network 116 to the outside network 120, such as the Internet. Hence, in this configuration, the accessible services on the inside network 116 may be viewed at a web page on the gateway server 110 and may be accessed through the gateway server web page.

The proxy applications 320 provide application level gateway support for a selected network service available on the inside network 116. Advantageously, a separate proxy application is provided for each type of network service so that an individual using a client browser on an outside network client computer can communicate or otherwise interact with the network services. Details relating to the purpose and function of the proxy applications 320 are discussed below in connection with FIG. 7.

FIG. 4 is a block diagram of one embodiment of the RAM 214 located within the gateway server 110. In the FIG. 4 embodiment, RAM 214 preferably includes a host list 410, and can also include a set of dynamic links 412. As discussed earlier, the dynamic links can be stored in either non-volatile memory 216 or RAM 214. The DHCP server 315 as discussed above provides the input to the host list 410.

The host list 410 maintains a list of computers and other network devices that are connected to the gateway server 110. As each computer or device connects to the gateway server 110, the DHCP server 315 assigns an IP address to that particular computer or device. The gateway server 110 then stores the IP address, or a reference, of that computer or device in the host list 410. If a network device to the gateway server 110 is turned off, disconnected, or otherwise deactivated, then the associated IP address is lost and the reference in the host list 410 is removed. Therefore, the host list 410 maintains a substantially current list of active computers and devices connected to the gateway server 110.

Figure 5:
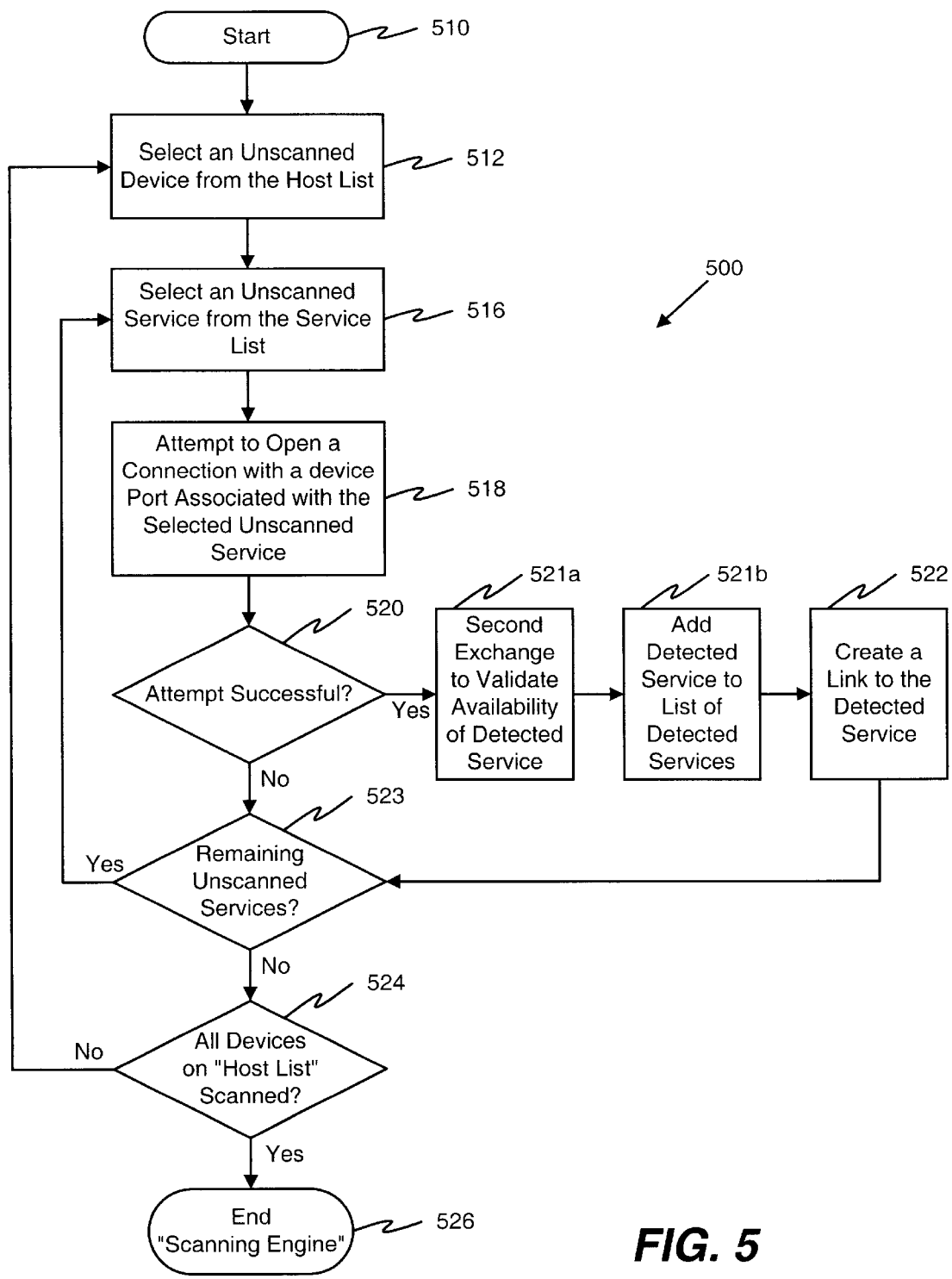
FIG. 5 is a flowchart illustrating a method for scanning an inside computer network for accessible services, according to the present invention.

FIG. 5 is a flowchart 500 that illustrates one embodiment for scanning a computer network using the gateway server 110. At block 510, the scanning engine 310 is started. As discussed above, the timer 312 periodically starts the scanning engine 310. In block 512, the scanning engine 310 checks the host list 410 to determine if there are any inside network devices or computers connected to the gateway server 110 and selects an unscanned inside network device from the host list 410.

After an unscanned device has been selected, then the scanning engine 310 selects an unscanned service from the service list 314, pursuant to block 518. Next, pursuant to block 518, the scanning engine 310 attempts to create a connection, or open a socket, with the device port of the selected device that is associated with the selected unscanned service. If, pursuant to block 520, the attempt to establish a connection was successful and an available service has been detected or discovered, then pursuant to block 521a, the scanning engine 310 initiates a second exchange with the port to validate the availability of the particular network service and, pursuant to block 521b, the detected service is added to a list of detected network services. A dynamic link is then created for that particular service and is stored in the dynamic links 318 or 412 pursuant to block 522.

The scanning engine 310 then continues to attempt to establish a connection for each of the remaining network services of the service list 314 for the selected device. Hence, if the result of the determination of block 523 is "yes," execution returns to block 516 to commence scanning for other network services on the selected network device.

After the scanning engine 310 has attempted to establish a connection with the selected network device for each service on the service list 314, the scanning engine 310 determines whether all of the devices on the host list 410 have been scanned pursuant to block 524. If all of the devices on the host list 410 have been scanned, then the scanning engine terminates its scan pursuant to block 526.

However, if there are network devices on the host list 410 that the scanning engine 310 has not scanned, the process returns to block 512 so that the scanning engine 310 can scan the next network device on the host list 410. Once all of the devices on the host list 410 have been searched for available services, the scanning process ends at block 526.

As discussed above, the list of available network services is advantageously published to the outside network 120 in the form of dynamic links on a gateway server web page using the gateway web server 316. These dynamic links can then be accessed and/or viewed by a user over the Internet by a client browser by browsing to the gateway server web page.

Advantageously, when a user at a computer on the outside network 120 browses to the gateway server web page and selects one of the dynamic links displayed thereon, the gateway server 110 forwards, proxies, routes, or transparently redirects connection from the outside network 120 to the associated service on the inside network 116. Particular methods of enabling communication between a client browser on the outside network 120 and a selected network service on the building network 116 are described below in connection with FIGS. 6 and 7.

Figure 6:
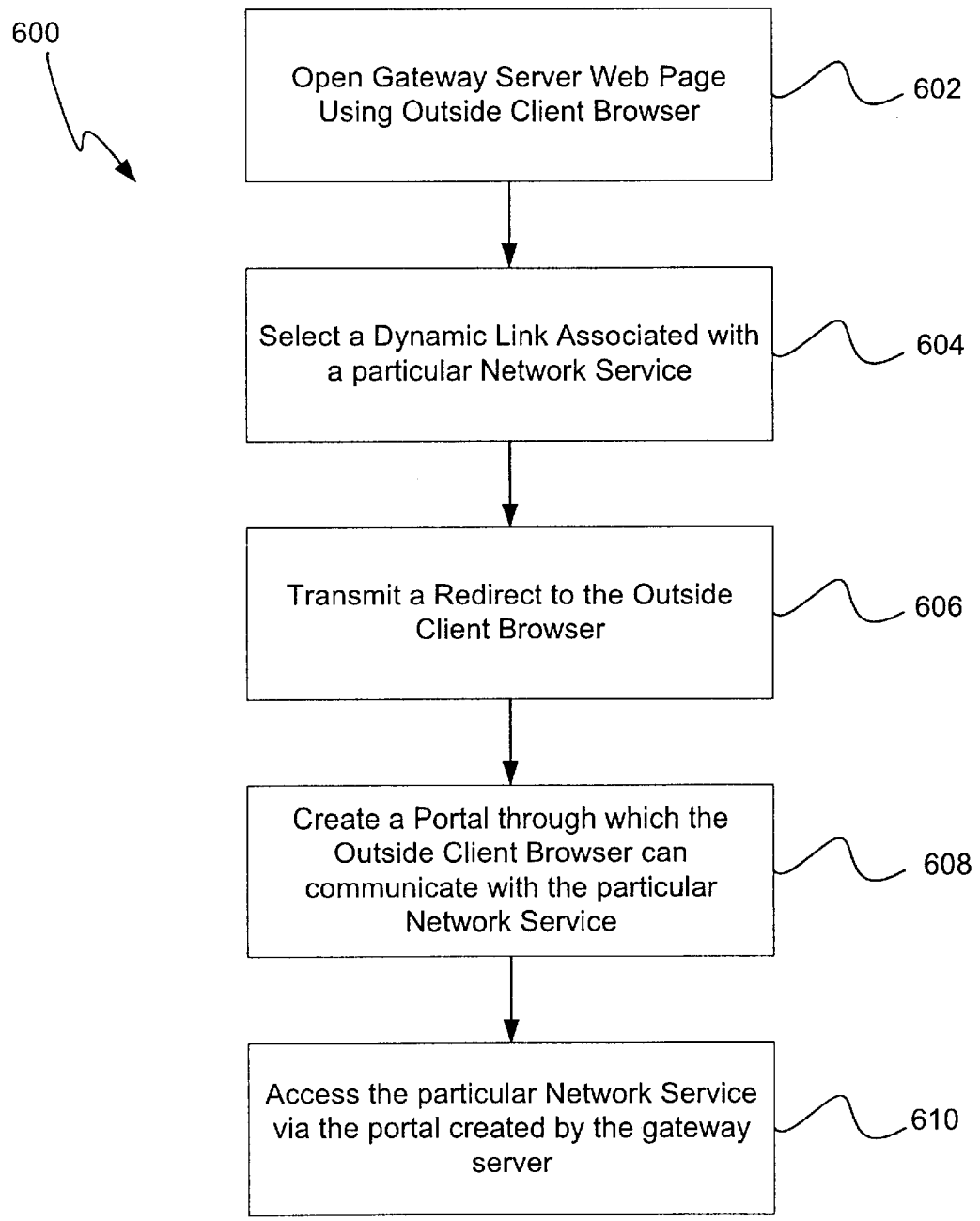
FIG. 6 is a flowchart illustrating one embodiment of a method for establishing a connection between a client browser on an outside network and a selected network service on the building network, according to the present invention.

FIG. 6 shows a flowchart 600 of a method of enabling communication between a client browser on the outside network 120 and a selected service on the inside network 116. In particular, the flowchart 600 illustrates a method for transparent redirection and network address translation. The method 600 begins at block 602, in which an outside network client browser opens the gateway server web page, such as by entering the URL (Uniform Resource Locator) for the gateway server web page. Once the gateway server web page is open on the client browser, an end user may obtain access to a selected network service by mouse clicking (double clicking) or otherwise selecting the published dynamic link associated with the network service, such as a particular file or directory, pursuant to block 604. Mouse clicking on the dynamic link causes the client browser to transmit a request for that network service, or resource, to the gateway server 110.

In response to the request for the network service, the gateway server 110 uses an HTTP redirect to transparently redirect the client browser to access another address associated with a portal associated with the selected network service. This redirect address is transmitted back to the outside client browser pursuant to block 606. The outside client browser then accesses the selected network service via the gateway server portal by following the redirect address.

The gateway server 110 creates the portal associated with the redirect address, or the selected network service, so that the selected network service and the outside client browser may communicate via the portal pursuant to block 608. Lastly, the outside client computer may access and communicate with the selected network service via the portal pursuant to block 610.

The method 600 is "transparent" to the end user at the outside client browser in that the end user need not actively participate in the redirection process. In this manner, the end user at the outside client browser may access a selected network service via a portal created by the gateway server 10 by simply mouse clicking on the dynamic link associated with the selected service.

Figure 7:
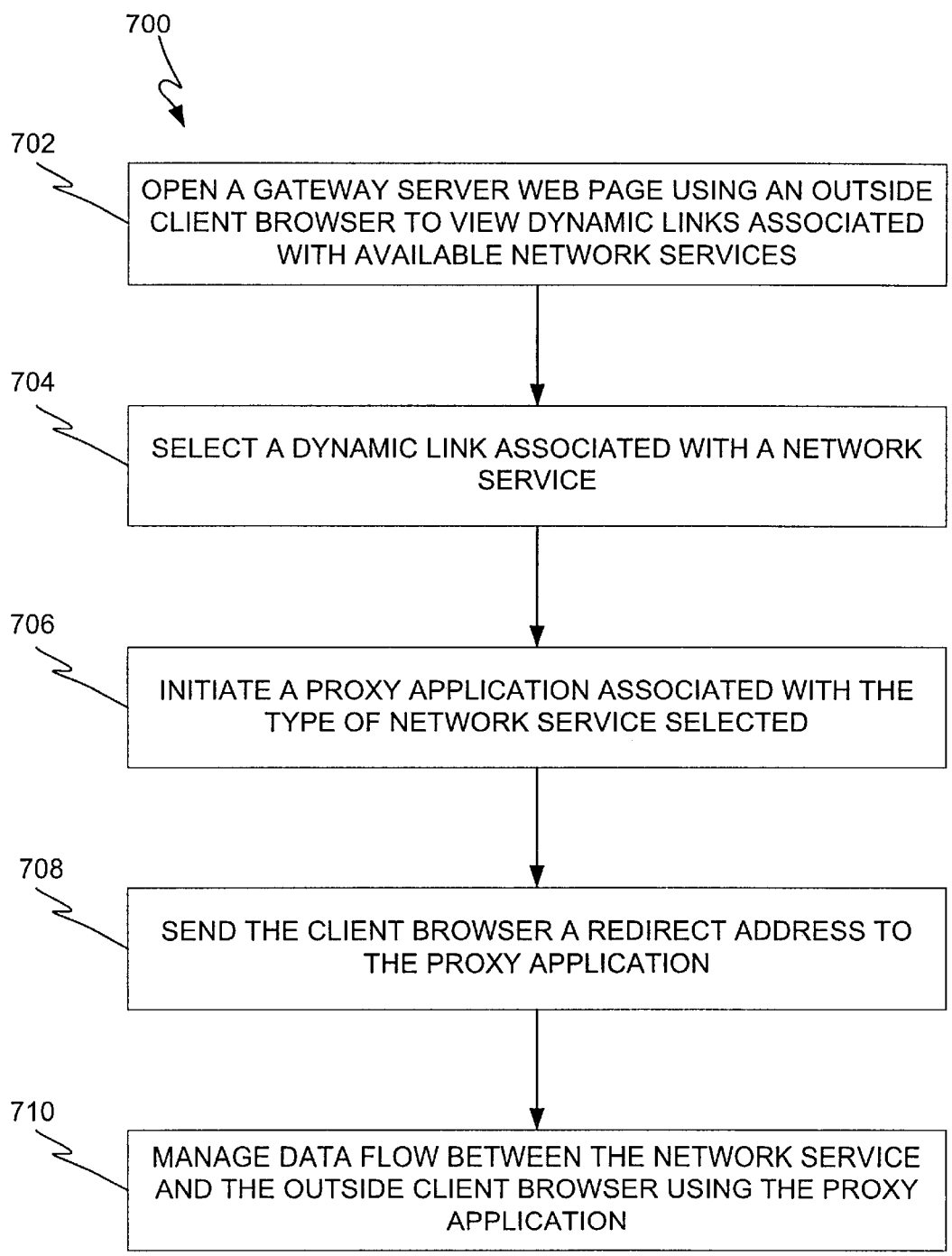
FIG. 7 is a flowchart illustrating one embodiment of a method for establishing a connection between a client browser on an outside network and a selected network service on the inside network, according to the present invention.

FIG. 7 illustrates an alternate method of permitting an end user at an outside client browser to access a network service or resource of the inside network 116 by selecting an associated link on the gateway server web page. In particular the flowchart 700 commences with the end user opening a gateway server web page using an outside client browser pursuant to block 702. Next, pursuant to block 704, the end user selects, by mouse clicking, the dynamic link on the gateway server web page that is associated with a selected inside network service. Mouse clicking on the dynamic link causes the client browser to transmit a request for that network service, or resource, to the gateway server 110.

Upon receipt of the request for the network service from the outside client browser, the gateway server identifies and initiates the proxy application 320 that is associated with the type of selected network service pursuant to block 706. In addition, the gateway server transmits a redirect address to the outside client browser to redirect the outside client browser to the initiated proxy application, pursuant to block 708. Once the outside client browser is connected directly to the initiated proxy application, the proxy application manages communications between the outside client browser and the selected inside network service pursuant to block 710.

In particular, the proxy application modifies the communications between the selected inside network service and the outside client browser. For example, the proxy application may translate addressing information within the communications according to the particular inside network service being accessed. In this manner, the end user at the outside client browser may access a selected network service via a proxy application initiated by the gateway server 110 by simply mouse clicking on the dynamic link associated with the selected service.

The invention has been explained above with reference to presently preferred embodiments. Other embodiments will be apparent to those skilled in the art in light of this disclosure. For example, the present invention may readily be implemented using configurations other than those described in the preferred embodiment above. Therefore, these and other variations upon the preferred embodiments are intended to be covered by the present invention, which is limited only by the appended claims.

What is claimed is:

1. A method of detecting available network services on a network, comprising:

identifying a network device coupled to the network, the network device having a port associated with a particular network service;

attempting to establish a connection with the port associated with the particular network service;

adding the particular network service to a list of currently available network services if the attempt to establish a connection with the port associated with the particular network service was successful;

publishing a web page comprising a dynamic link to at least one of the network services identified in the list of currently available network services;

initiating a second exchange with the port to validate the availability of the particular network service if the attempt to establish a connection with the port was successful; and using a timer to establish a periodic rate to identify network devices coupled to the network in order to update the list of currently available network services.

2. The method of claim 1, wherein the identifying, attempting, publishing, and adding are periodically repeated to periodically update the list of available network services.

3. The method of claim 1, further comprising creating a predetermined list of potential available network services from which the currently available network services can be identified.

4. The method of claim 1, further comprising:
selecting the dynamic link to access the network service associated with the dynamic link.

5. The method of claim 4, further comprising:
interfacing access to the network service associated with the dynamic link with a proxy application for managing communications with the network service; and
allowing a computer on an external network to access a currently available service if a password is presented to access the currently available service.

6. The method of claim 1, further comprising:
selecting the dynamic link to access the network service associated with the dynamic link;
creating a portal associated with the network service; and
directing communications with the network service through the portal.

7. The method of claim 1, wherein the identifying, attempting, and adding are performed by a gateway server interposed between a building network and an outside network.

8. The method of detecting available network services on a network according to claim 1, wherein the step of identifying a network device includes receiving a broadcast from the network device.

9. The method of detecting available network services on a network according to claim 1, wherein the step of identifying a network device includes receiving a multicast from the network device.

10. A method for automatically providing links to accessible services on an inside network, comprising:
scanning each device on the inside network for accessible services;
creating a dynamic link to each detected accessible service;
publishing each dynamic link on an outside network to allow access to each detected accessible service;
initiating a second exchange with the detected accessible service to validate the availability of the detected accessible service if the scanning indicated an accessible service was detected; and
using a timer to establish a periodic rate to scan devices on the inside network for accessible services.

11. The method of claim 10, further comprising accessing the accessible service through one of the dynamic links.

12. The method of claim 10, further comprising:
redirecting a request for a selected network service to a portal associated with the selected network service; and
transmitting communications with the selected network service via the portal.

13. The method of claim 10, further comprising:
redirecting a request for a selected network service to a proxy application associated with the selected network service;
managing communications with the selected network service with the proxy application.

14. A method for automatically detecting available network services on an inside network, comprising:
providing a gateway server interposed between a building network and an outside network;
coupling at least one network device to the building network, the network device having at least one port associated with a network service;
periodically attempting to establish a connection between the gateway server and the port associated with the network service by using a timer;
adding a reference to the network service to a list of available network services if the attempt to establish a connection between the gateway server and the port associated with the network service was successful;
initiating a second exchange with the port to validate the availability of the detected network service if the attempt to establish a connection between the gateway server and the port was successful; and
publishing a dynamic link to at least one of the network services identified in the list of available network services.

15. The method for automatically detecting available network services on an inside network according to claim 14, further comprising publishing the list of available network services on a gateway server web page.

16. The method for automatically detecting available network services on an inside network according to claim 14, further comprising:
creating a separate dynamic link for each available network service identified in the list of available network services; and
publishing the dynamic link on a gateway server web page.

17. The method for automatically detecting available network services on an inside network according to claim 14, further comprising:
creating a separate dynamic link for each available network service identified in the list of available network services;
publishing the dynamic link on a gateway server web page;
selecting one of the dynamic links on the gateway server web page from a client computer on the outside network; and
redirecting connection from the client computer on the outside network to the available network service associated with the selected dynamic link.

18. The method for automatically detecting available network services on an inside network according to claim 14, further comprising:
creating a separate dynamic link for each available network service identified in the list of available network services;
publishing the dynamic link on a gateway server web page;
selecting one of the dynamic links on the gateway server web page from a client computer on the outside network; and
proxying connection from the client computer on the outside network to the available network service associated with the selected dynamic link.

19. The method for automatically detecting available network services on an inside network according to claim 14, further comprising:
creating a separate dynamic link for each available network service identified in the list of available network services;
publishing the dynamic link on a gateway server web page;
selecting one of the dynamic links on the gateway server web page from a client computer on the outside network; and routing connection from the client computer on the outside network to the available network service associated with the selected dynamic link.

20. A system for detecting network services on an inside network wherein the inside network is coupled to a client computer on an outside network, comprising:
   a gateway server interposed between the inside network and the outside network;
   the gateway server including a scanning engine for periodically attempting to open a socket with an inside network device port that is associated with a particular network service to determine whether the particular network service is available on the associated inside network device;
   a timer to establish a periodic scan rate for the scanning engine, wherein the scanning engine initiates a second exchange with the detected available service to validate the availability of the particular network service; and
   a web server to publish a web page comprising a dynamic link to at least one of the available network services to the outside network.

21. The system for detecting network services on an inside network according to claim 20, wherein the gateway server requires a password for a device on the external network to access one or more of the detected available network service.

22. The system for detecting network services on an inside network according to claim 20, wherein the gateway server further comprises:
   a proxy application for managing communications between the network service and the outside network client computer.

23. The system for detecting network services on an inside network according to claim 20, wherein the gateway server further comprises:
   the gateway server being configured to redirect connection from the outside network client computer to a specific network service on the inside network upon selection of a specific dynamic link associated with the specific network service by the outside network client computer.

24. A system for detecting available network services on a network, comprising:
   means for identifying a network device coupled to the network, the network device having a port associated with a particular network service;
   means for attempting to establish a connection with the port associated with the particular network service;
   means for adding the particular network service to a list of currently available network services if the attempt to establish a connection with the port associated with the particular network service was successful;
   means for publishing a web page comprising a dynamic link to at least one of the network services identified in the list of currently available network services;
   means for initiating a second exchange with the port to validate the availability of the particular network service if the attempt to establish a connection with the port was successful; and
   means for using a timer to establish a periodic rate to identify network devices coupled to the network in order to update the list of currently available network services.

25. A system for automatically providing links to accessible services on an inside network, comprising:
   means for scanning each device on the inside network for accessible services;
   means for creating a dynamic link to each detected accessible service;
   means for publishing each dynamic link on an outside network to allow access to each detected accessible service;
   means for initiating a second exchange with the detected accessible service to validate the availability of the detected accessible service if the scanning indicated an accessible service was detected; and
   means for using a timer to establish a periodic rate to scan devices on the inside network for accessible services.

26. A system for automatically detecting available network services on a building network, comprising:
   means for providing a gateway server interposed between a building network and an outside network;
   means for coupling at least one network device to the building network, the network device having at least one port associated with a network service;
   means for periodically attempting to establish a connection between the gateway server and the port associated with the network service;
   means for adding a reference to the network service to a list of available network services if the attempt to establish a connection between the gateway server and the port associated with the network service was successful;
   means for initiating a second exchange with the port to validate the availability of the detected network service if the attempt to establish a connection between the gateway server and the port was successful; and
   means for publishing a dynamic link to at least one of the network services identified in the list of available network services.

27. A computer readable medium comprising program instructions for instructing a computer to detect available network services on a network by performing the steps of:
   identifying a network device coupled to the network, the network device having a port associated with a particular network service;
   attempting to establish a connection with the port associated with the particular network service;
   adding the particular network service to a list of currently available network services if the attempt to establish a connection with the port associated with the particular network service was successful;
   publishing a web page comprising a dynamic link to at least one of the network services identified in the list of currently available network services;
   initiating a second exchange with the port to validate the availability of the particular network service if the attempt to establish a connection with the port was successful; and
   using a timer to establish a periodic rate to identify network devices coupled to the network in order to update the list of currently available network services.

28. A computer readable medium comprising program instructions for instructing a computer to automatically provide links to accessible services on an inside network by performing the steps of:
   scanning each device on the inside network for accessible services;

creating a dynamic link to each detected accessible service;

publishing each dynamic link on an outside network to allow access to each detected accessible service;

initiating a second exchange with the detected accessible service to validate the availability of the detected accessible service if the scanning indicated an accessible service was detected; and using a timer to establish a periodic rate to scan devices on the inside network for accessible services.

* * * * *